United States Patent Office 2,835,620
Patented May 20, 1958

2,835,620

METHOD OF PREPARING VINYL RESIN GRANULES AND COVERING CONTAINING SAME

Francis John Woodford Bartlett, Pontypool, Mon, England, assignor to Francis John Woodford Bartlett, Pontypool, Mon, England, and William W. Prager, New York, N. Y., trustees No Drawing. Application April 4, 1955
Serial No. 499,251

4 Claims. (Cl. 154—49)

My invention relates to a novel polyvinyl-type coating composition particularly suitable for use in the manufacture of floor and wall covering and the like and to a novel method of preparing the same.

Previous manufacturing processes have consisted of hot processing of vinyl resins with plasticizers by heating these materials to high temperatures, mixing thoroughly, and then passing the mixture through calender rolls. These hot process materials are rather viscous and the calender rolls, in order to produce a satisfactory product, must be preheated, and even so, require high power inputs for satisfactory operation. Under these conditions, it is difficult to apply the coating to thin flexible organic backing materials without the danger of destroying or disintegrating such backings.

Another method is to employ polyvinyl resins and plasticizers in a colloidal or paste form such as may be applied by spreading, spraying or casting onto backings. However, such compositions are normally of a uniform color and because of their fluidity, patterned effects cannot be controlled within practical limits without resorting to embossing or printing methods.

Another method which has been proposed is to mix a vinyl resin and a plasticizer and heat the resulting pasty mixture until it reaches a powdery form. Temperatures required in this instance are from about 40 to 150 degrees centigrade and if the heating is done carefully a dry, frangible, brittle powdery mass can be obtained. Such masses also require heating to the soft stage, must be applied to the backing by embossing or similar pressure methods and do not readily allow for the formation of sheets of repeatable and easily controllable patterns. These powders, when preheated, must be compressed by passing them through rolls of equal speed. Otherwise the hot powdered mat will be stripped from the backing material.

I propose to overcome the difficulties of the prior art hereinabove referred to by providing a novel resinous composition and a novel method of preparing the same which will provide discrete malleable particles in the form of granules which have the property of being easily applied to any of the conventional organic, inorganic, thin or heavy backings. The granules to which I refer are of such texture and consistency so that they can be calendered with low power rolls at room temperature onto a low tensile strength backing such as paper, impregnated felt, paper coated aluminum foil and similar weak supporting films.

Accordingly, it is an object of my invention to provide a novel vinyl-type resinous composition which is particularly suitable as a coating agent for floor coverings, wall coverings, or the like.

It is another object of my invention to provide a method for preparing a novel vinyl-type resinous composition in the form of malleable granules which can be applied to strong or weak backing materials in a manner more economical than any heretofore realized.

Still another object of my invention is to provide a method by which selected vinyl-type polymers can be blended with each other and with suitable plasticizers and fillers to form malleable granules which can be readily calendered in a manner so as to provide an economical floor or wall type covering material which can readily contain controlled repeatable patterns.

These and other objects of my invention will become apparent from hte description which follows:

Essentially my invention involves the use of polymers from the group consisting of polyvinyl chloride, copolymers of vinyl chloride and vinyl acetate, and copolymers of vinyl chloride and vinylidene chloride, in which a portion of the resinous composition comprises polymers which have been made by the emulsion polymerization process and which form a paste at room temperature, hereinafter referred to as "emulsion polymers"; and in combination therewith, polymers of similar or identical chemical composition which have been formed by a dispersion polymerization process, hereinafter referred to as "dispersion polymers" and which are identifiable by the fact that at room temperatures they will not readily form a dispersion or colloidal suspension. Both of these materials are well known to the art and are sold under trade names hereinafter referred to.

The paste-type polymer made by the emulsion process in my vinyl mixture should ordinarily be present in amounts from 45 to 90 percent by weight of the total resin composition. The balance of the resin composition, that is, from 10 to 55 percent should comprise the polymer which has been made by the dispersion polymerization process. In a preferred embodiment of my invention the amount of emulsion polymer may vary between 80 and 88 percent with the remaining 12 to 20 percent of the resin constituent consisting of dispersion polymer. Of course, the final coating composition in addition to the above mentioned resin constituents may also include stabilizers, fillers, and lubricants, as desired.

When these polymers are combined by the method hereinafter described, they are capable of forming malleable granules without the application of externa heat, the said granules being readily formed into a sheet-like body by the application of relatively low pressures. This sheeting material may be applied to suitable backings of high, or even relatively low tensile strength so as to form the desired wall covering, floor covering, or other suitable articles of this nature. The necessary details for forming my novel composition are set forth in the description which follows:

The initial step in the processing is the mixing of a dispersion type polyvinyl resin with suitable vinyl plasticizers. Examples of such plasticizers are: dibutyl phthalate, dioctyl phthalate, diethyl-hexyl phthalate and diisoctyl phthalate, tricresyl phosphate and alkylaryl phthalates such as benzyl butyl phthalate.

From 2.5 to 10 parts by weight of dispersion polymer and sufficient plasticizer to form a mix of 100 parts by weight are heated together at between 90 and 140° C. until the vinyl polymer is solubilized. This raises the viscosity of the plasticizer to form a gel of from about 80 to 500,000 centipoises or more, depending upon the type of polymer and plasticizer employed.

The gel produced by the foregoing method is converted to a thick paste or dough by adding thereto emulsion or paste-type polyvinyl resin in a ratio of about 125 to 400 parts by weight emulsion polymer to every 100 parts of gelled mix of plasticizer and dispersion polymer. To this paste are added either organic or inorganic fillers; such as, asbestos, calcium carbonate, china clay, barytes or other similar fillers which are well known to the art.

The fillers are added in the proportion of about 10 to 100 parts of filler per 100 parts of paste mix.

In the event that asbestos is used as a filler, the fibres will be about 120 mesh while in the case of an inorganic filler the particle size runs between about 200 and 300 mesh. After a doughy mixture is formed, about 15 parts of dispersion polymer are added to the filled paste which brings the dough to the desired drier physical consistency necessary to make the desired malleable or pliable granule. Other ingredients normal to vinyl resin processing, such as stabilizers (e. g. tin mercaptide), lubricants, colors, pigments, and secondary plasticizers, may be added before the final addition of the dispersion polymer.

The stock is now granulated or "scratched" by conventional methods. It is important to point out that no external heat is applied after the point where the gelled mix of plasticizer and dispersion resin has cooled to room temperature and that the conversion of the paste into the desired doughy mixture and granules is done without the addition of external heat. In general, the desirable temperatures for this operation are between 10 and 30° C., and water cooled equipment may be used in order to insure that these temperatures are maintained.

The granules which are formed are of a malleable or pliable nature and can range between 10 and 120 mesh size. They have the highly desirable properties of being readily calendered by relatively low pressure devices into thin sheets suitable for use in wall or floor coverings. If desired, the granules can be applied by means of a vibrator onto either a relative high or low tensile strength backing material, flexible or non-flexible such as metal band, impregnated felt or paper backing.

A particular advantage of these granules is their ability to form a readily repeatable pattern. This is carried out by first granulating the stock material and then mechanically mixing these granules. Such a mechanical mix may then be passed to a differential mixing roll. The faster roll will pick up the sheet which is now of two or more colors and this sheet can then be disintegrated to form granules which are in themselves multicolored. Such granules when applied to a backing and calendered will form a patterned effect, such patterns being repeatable again and again within very narrow limits.

The granules, after being formed on a fabric, paper or other backing materials, or, if desired, after being calendered into sheet form without the use of backing material, is sent into a heating oven which is maintained between about 150° and 190° C.

These granules, which are formed by my method, are entirely different from the powdered pulverulent frangible solid mixtures known to the prior art. Such powdered mixtures have the disadvantage that they are not coagulated when under low pressure without the application of external heat and under the influence of the required heat and pressure conditions may tend to destroy any weak tensile strength backings; as for example, impregnated felt or paper. My granules on the other hand when applied may be calendered into sheets by feeding them into the nip of calender rolls. This can be done in various manners so that either a "pencil" or folding bands of stock can be obtained which will produce either a jaspe or marbling effect in the final pattern. These granules flow into the nip of calender rolls and are not merely compressed by these rolls as are powder resins of the type known to the prior art. It is this flow which allows for the successful reproduction of fanciful patterns such as striated patterns, thereby making a vinyl coating composition suitable for floor coverings, wall coverings and the like which is much more saleable then those previously known.

These granules which form an essential feature of my invention include as the resinous components thereof, the combination of emulsion or paste-type vinyl resin and a dispersion type vinyl resin. As hereinbefore mentioned, the former term refers to a resin such as polyvinyl chloride which is made by an emulsion type polymerization process well known to the art. The dispersion type polymer, on the other hand, is made by the well known dispersion type polymerization process and the dry resin will not, when put into plasticizers, form a colloid or dispersion. On the other hand, it tends merely to settle out in the plasticizer and absorbs only a relatively small proportion of the plasticizer.

The emulsion or paste type polymers to which I refer are sold under various trade names, such as: Opalon 410, sold by Monsanto Chemical Company; Geon 121, sold by Goodrich; Exon 654, a Firestone product; Vestolite P. H. sold by Chemische Werke Hols, Germany; Solvic 334, of Solvic, Belgium, and QYNV of Bakelite.

The dispersion type polymers to which I refer are sold under the names of: Opalon 300, of Monsanto Chemical Company; Geon 101, Geon 202 and Geon Ep-103 of Goodrich; Solvic 136 of Solvic, Belgium; and VYNW of Bakelite.

The major ingredient of all these resins is polyvinyl chloride; however, the Geon 202 referred to above is a copolymer of vinylchloride and vinylidene chloride. The VYNW referred to is a mixture of polyvinyl chloride and polyvinyl acetate which contains between 93 and 95 percent vinylchloride. The use of these materials will become more apparent in the following specific examples in which all proportions are indicated on a weight basis:

*Example I.*—Five parts of Vinylite VYNW dispersion type polymer (a carbide and carbon copolymer of vinyl chloride and vinyl acetate in the proportion of 95:5) are mixed with 95 parts of di-octylphthalate. The mixture is heated to 120° C. and then cooled to room temperature. To 60 parts of the resulting gelled plasticizer, are added 100 parts of Opalon 410 emulsion type polyvinyl chloride. The resin-plasticizer mix is stirred for a period of 15 minutes and then 50 parts of china clay, 5 parts of mineral oil and one-half part of a tin mercaptide stabilizer are added. These materials are mixed for a period of 15 minutes; whereupon, 10 parts of Vinylite VYNW are added and the mixing continued for a period of 5 minutes. During this time the mixture has been water cooled so that the temperature is maintained between 10 and 15° C. The stock is then ejected onto a pair of differential mixing rolls; the sheet formed on the high speed roll is granulated or "scratched" by contacting it with a rotating knife which breaks the sheet formed into 40–60 mesh granules. The size of these granules can be varied by control of relative speeds of the rotating knife and the pick up roll of the differential mixing rolls.

*Example II.*—7.5 parts of Opalon 300 dispersion type polyvinyl chloride are mixed with 92.5 parts of tricresyl phosphate. The mixture is gelled by heating to 110° C. and then cooling to room temperature and is maintained below room temperature in a water cooled mixer of the Werner-Pfleiderer type. When a thick paste has been formed by the addition of 300 parts of Vestolite PH, fillers in the proportion of 100 parts of barites are added and the mixing continued until a suitable thick paste or dough-like form has been obtained. 10 parts of Solvic 136 are then added for an additional short period of mixing; say, 5 to 10 minutes. The stock is ejected and granulated as described above.

*Example III.*—The procedure described in Example I above was followed, using as the dispersion type polymer Geon Ep-101 which is dissolved in a plasticizer consisting of equal parts of tricresyl phosphate and butyl benzyl phthalate.

*Example IV.*—The same procedure of Example I was repeated successfully using as the dispersion polymer Geon 202 of Goodrich which is a copolymer of vinyl chloride and vinylidene chloride and as the plasticizer di- 2-ethyl-hexyl phthalate (Flexol D. O. P.). The emulsion polymer used in this case was Geon 121.

*Example V.*—Two parts of Opalon 300 dispersion type polyvinyl chloride is mixed with 50 parts of tricresyl phosphate. The mixture is heated to 110° C. and cooled to room temperature. To 30 parts of the resulting gelled plasticizer are added 45 parts of Exon 654 emulsion type polyvinyl chloride. The resin-plasticizer mix is stirred for a period of 12 minutes and then 20 parts of 120 mesh asbestos fibre, 3 parts of mineral oil and 20 parts of Indian red pigment are then added. These materials are mixed for 10 minutes whereupon 5 parts of Opalon 300 are added and the mixing continued for an additional 5 minute period. During the preceding mixing operations a water cooled container maintains the temperature of the mixture between 20 and 25° C. The stock is then placed between a pair of mixing rolls. The sheet formed on the high speed roll, which operates at a rate 25 percent faster than the other roll is "scratched" into discrete particles or granules by contact with a rotating knife. The granule size is in the range of 60 to 80 mesh.

The vinyl coating produced by this procedure may be made into various thicknesses ranging from a few (5–10) mils in size up to about one-quarter of an inch. Ordinarily, for floor coverings or wall coverings, thicknesses of about one-eighth of an inch are preferred.

As stated previously, vinyl sheetings made by my method may be bonded to suitable backings either permanently or to paper backings from which they may later be stripped so as to form a laminated vinyl coating composition in which two or more sheets of similar vinyl coating are secured together by a polyvinyl chloride-polyvinyl acetate adhesive composition.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A method for making a malleable granule having as the sole resinous component thereof a plasticized resin from the group consisting of polyvinyl chloride, copolymers of vinyl chloride and vinyl acetate and copolymers of vinyl chloride and vinylidene chloride and mixtures thereof, which comprises mixing a resin obtained by dispersion polymerization of the said group with a plasticizer, raising the viscosity of the said resin-plasticizer mixture by heating the same from 90° C. to 140° C., adding to the said mixture a quantity of a resin obtained by emulsion polymerization of the aforementioned group so that the entire mixture forms a thick paste, adding to the said pasty mixture, fillers so as to impart thereto a doughy texture and adding to the said doughy mixture more of the dispersion polymer so as to provide a material containing as its resinous constituents 45 to 90 percent polymer obtained by emulsion polymerization and 10 to 55 percent polymer obtained by dispersion polymerization of such consistency that it can be disintegrated into lumps or granules without recoagulation until subjected to pressure.

2. A covering material for floors, walls, and the like having a resinous layer and a backing layer, and in which the resinous layer is formed from malleable granules made in accordance with the method of claim 1.

3. A method for making a malleable granule having as the sole resinous component thereof a plasticized resin from the group consisting of polyvinyl chloride, copolymers of vinyl chloride and vinyl acetate and copolymers of vinyl chloride and vinylidene chloride and mixtures thereof, which comprises mixing 2.5 to 10 parts of a resin obtained by dispersion polymerization of the said group with a 90 to 97.5 parts of a plasticizer, raising the viscosity of the said resin-plasticizer mixture by heating the same to from 90 to 140° C. until the vinyl polymer is solublized, adding to the said mixture a quantity of a resin obtained by emulsion polymerization of the aforementioned group so that the entire mixture forms a thick paste, adding to the said pasty mixture fillers so as to impart thereto a doughy texture and adding to said doughy mixture more of the dispersion polymer so as to provide a material containing as its resinous constituent 45 to 90 percent polymer obtained by emulsion polymerization and 10 to 55 percent polymer obtained by dispersion polymerization.

4. The method of claim 3 in which all steps performed after the production of the high viscosity resin-plasticizer mixture are conducted between 10 and 30° C.

References Cited in the file of this patent

FOREIGN PATENTS

| | | |
|---|---|---|
| 580,729 | Great Britain | Sept. 18, 1946 |
| 680,226 | Great Britain | Oct. 1, 1952 |